United States Patent [19]

Kurimoto et al.

[11] Patent Number: 5,083,637
[45] Date of Patent: Jan. 28, 1992

[54] APPARATUS FOR INPUTTING COMMODITY DATA

[75] Inventors: Yukuo Kurimoto, Kumasaka; Nobuhiko Fujii, Mikado; Mitunori Kohno, Shuzenji; Takao Umebara, Mifuku, all of Japan

[73] Assignee: Tokyo Electric Co., Ltd., Tokyo, Japan

[21] Appl. No.: 378,773

[22] Filed: Jul. 12, 1989

[30] Foreign Application Priority Data

| Jul. 12, 1988 | [JP] | Japan | 63-172895 |
| Jul. 12, 1988 | [JP] | Japan | 63-172897 |
| Jul. 12, 1988 | [JP] | Japan | 63-172898 |
| Jul. 12, 1988 | [JP] | Japan | 63-172899 |
| Jul. 12, 1988 | [JP] | Japan | 63-172900 |

[51] Int. Cl.⁵ .............. G06K 7/10; A47F 9/04
[52] U.S. Cl. .................... 186/61; 235/385; 235/462; 248/397
[58] Field of Search .............. 186/61; 364/405; 235/383, 385, 145 R, 462; 248/371, 284, 921, 923, 918, 291, 920, 397; 108/6, 9, 10

[56] References Cited

U.S. PATENT DOCUMENTS

| 3,902,034 | 8/1975 | Isozaki | 235/745 R X |
| 4,350,098 | 9/1982 | Shirono et al. | 108/6 X |
| 4,369,361 | 1/1983 | Swartz et al. | 235/454 X |
| 4,422,745 | 12/1983 | Hopson | 235/462 X |
| 4,652,732 | 3/1987 | Nicki | 235/462 |
| 4,672,184 | 6/1987 | Fujiwasa et al. | 235/454 X |
| 4,762,984 | 8/1988 | Knowles et al. | 235/383 |
| 4,789,048 | 12/1988 | Cramer et al. | 186/61 |
| 4,838,383 | 6/1989 | Saito et al. | 186/61 X |

FOREIGN PATENT DOCUMENTS

| 36781 | 9/1981 | European Pat. Off. . |
| 309206 | 3/1989 | European Pat. Off. . |
| 309207 | 3/1989 | European Pat. Off. . |
| 2373251 | 7/1978 | France . |
| 62-20066 | 1/1987 | Japan . |
| 63-45665 | 3/1988 | Japan . |
| 63-45666 | 3/1988 | Japan . |
| 63-103183 | 7/1988 | Japan . |

OTHER PUBLICATIONS

Cooper, C. N. and Kekas, O. H., Display Assembly for Point-of-Sale Terminal, IBM Tech. Discl. Bulletin, 12/1979.

*Primary Examiner*—Robert J. Spar
*Assistant Examiner*—William M. Hienz
*Attorney, Agent, or Firm*—Oblon, Spivak, McClelland, Maier & Neustadt

[57] ABSTRACT

An apparatus for inputting commodity data including a bar code scanner having a reading window on a front surface thereof, a keyboard for inputting the commodity data which keyboard is supported at an upper portion of the bar code scanner, a cashier's display and a supporting member for rotatably supporting the bar code scanner in such a manner that the bar code scanner can be rotated about a horizontal pivotal axis. The bar code scanner can be rotated according to the kind of a commodity or the height of a cashier. Accordingly, a bar code of the commodity can be placed to a laser beam scanning area by the cashier in a natural posture, and can be read by the bar code scanner reliably and easily.

1 Claim, 10 Drawing Sheets

APPARATUS FOR INPUTTING COMMODITY DATA

FIELD OF THE INVENTION AND RELATED ART STATEMENT

The present invention relates to an apparatus for inputting commodity data including a bar code scanner for reading a bar code attached to a commodity and a keyboard for inputting the commodity data.

In a conventional apparatus for inputting commodity data, a bar code scanner and a keyboard are provided at a central portion of a sacker table. During the course that a cashier takes out a commodity from a basket placed on the sacker table at one end thereof and then puts the commodity into another basket placed on the sacker table at the other end, a bar code attached on the commodity taken by the cashier is read by the bar code scanner. If no bar code is attached or the bar code is stained or broken to result in incapability of reading by the bar code scanner, a commodity class and account are registered by the keyboard.

In such an input apparatus, the bar code scanner is fixedly supported, and a scanning direction and range of laser beam from a reading window of the bar code scanner are fixed. To the contrary, the position of the bar code attached to the commodity is various according to the kind of the commodity, and the height of the commodity taken by the cashier is also various according to the height of the cashier. Accordingly, the cashier is obliged to take an unnatural posture such as an angle of bending of her arms and waist, so as to place the bar code in the scanning range of the laser beam from the reading window, causing a bad operability and fatigue.

OBJECT AND SUMMARY OF THE INVENTION

It is a first object of the present invention to provide a commodity data inputting apparatus which enables the cashier to reliably and easily read the bar code.

It is a second object of the present invention to provide a commodity data inputting apparatus which enables the cashier to easily operate the keyboard.

It is a third object of the present invention to provide a commodity data inputting apparatus which may maintain a facing angle of a customer's display irrespective of a change in the angle of inclination of the bar code scanner.

It is a fourth object of the present invention to provide a commodity data inputting apparatus which may eliminate the interference of the bar code scanner with other furniture or the like and thereby protect the bar code scanner.

It is a fifth object of the present invention to provide a commodity data inputting apparatus which may protect the display.

It is a sixth object of the present invention to provide a commodity data inputting apparatus wherein the cashier's display is located at a position within a visible field of the cashier when the cashier looks at the commodity placed in opposition to the reading window of the bar code scanner.

It is a seventh object of the present invention to provide a commodity data inputting apparatus which enables the cashier to easily rotate the bar code scanner.

It is a eighth object of the present invention to provide a commodity data inputting apparatus which enables the cashier to easily adjust the height of the bar code scanner.

According to the present invention, there is provided an apparatus for inputting commodity data including a bar code scanner having a reading window on a front surface thereof, a keyboard for inputting the commodity data which keyboard is supported at an upper portion of the bar code scanner, and a supporting member for rotatably supporting the bar code scanner in such a manner that the bar code scanner can be rotated about a horizontal pivotal axis. The bar code scanner can be rotated according to the kind of a commodity or the height of a cashier. Accordingly, a bar code of the commodity can be placed to a laser beam scanning area by the cashier in a natural posture, and can be read by the bar code scanner reliably and easily. Further, as the keyboard can be displaced together with the bar code scanner by rotating the bar code scanner toward the cashier, the keyboard can be brought into a proper operating position, thereby improving the operability of the keyboard.

DETAILED DESCRIPTION OF THE PREFERRED EMBODIMENTS

Figure 1:
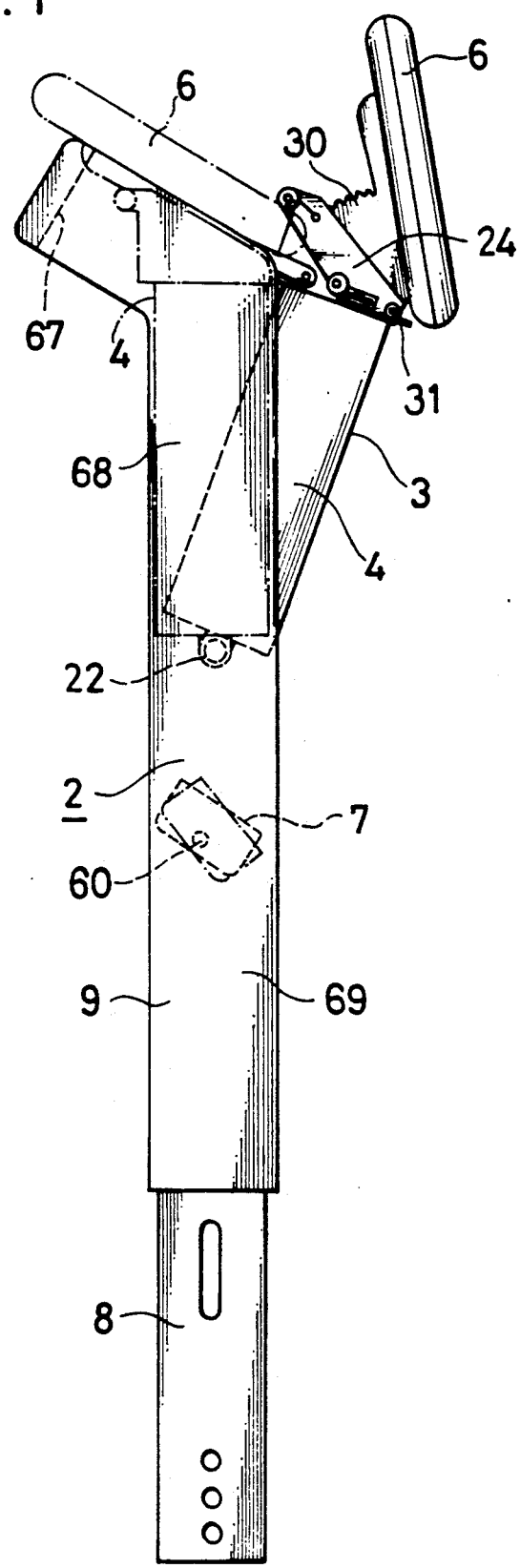
FIG. 1 is a left side view of a first preferred embodiment of the present invention.

There will now be described a first preferred embodiment of the present invention with reference to FIGS. 1 to 9. Referring first to FIG. 9, reference numeral 1 designates a sacker table provided at its central portion with a frame 2 for supporting a bar code scanner 4 having a reading window 3 on a front surface thereof, a keyboard 6 for inputting commodity data, and a display 7 for a cashier. A body case 5 of the keyboard 6 is integrally formed with a card inserting portion 5a for inserting a magnetic card thereinto. The body case 5 includes under the card inserting portion 5a a magnetic data reading portion (not shown) for reading magnetic data of the magnetic card.

Figure 8:
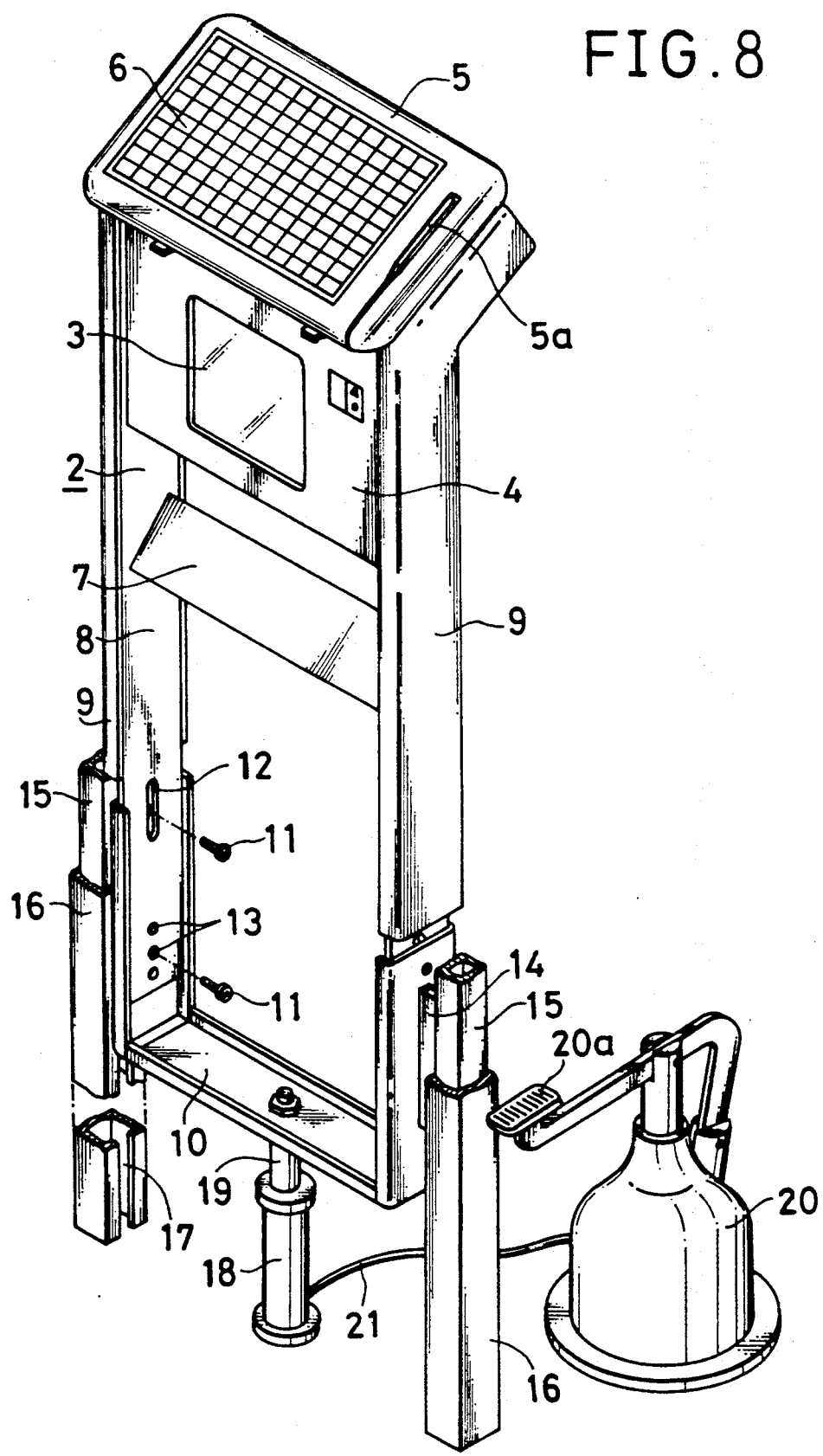
FIG. 8 is a perspective view of the connecting structure for the frame and the hydraulic cylinder.
Figure 9:
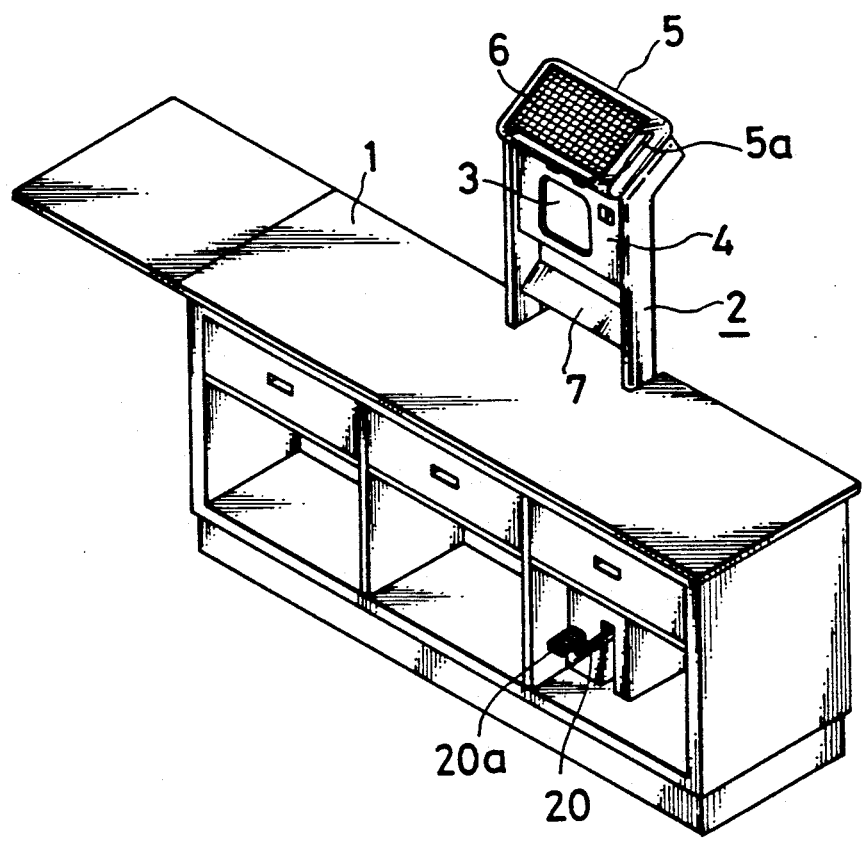
FIG. 9 is a perspective view of the preferred embodiment mounted to a sacker table.

Referring to FIG. 8, the frame 2 is constructed of a pair of right and left pillars 8, a pair of pillar covers 9 for covering outside surfaces of the pillars 8 from a central position to an upper position thereof, and a U-shaped connecting frame 10 for connecting lower portions of the pillars 8. Each of the pillars 8 is formed with a vertically elongated hole 12 and plural set holes 13 arranged vertically. On the other hand, the connecting frame 10 is formed with plural tapped holes (not shown) arranged in alignment with the elongated hole 12 and the set holes 13 of each pillar 8. A set screw 11 is inserted from the inside of the frame 2 through the elongated hole 12 of each pillar 8 into the tapped hole of the connecting frame 10, and another set screw 11' is also inserted from the inside of the frame 2 through any one of the set holes 13 of each pillar 8 into the other tapped hole of the connecting frame 10. Accordingly, the height of the frame 2 can be adjusted by selecting one of the set holes 13 into which the set screw 11' is to be inserted. Thus, the pillars 8 are telescopically movably mounted to the connecting frame 10. A pair of vertically elongated projections 14 are fixed on outer side surfaces of the connecting frame 10, and a pair of rectangular pipes 15 are fixed to the projections 14, respectively. The rectangular pipes 15 are vertically slidably inserted in a pair of vertical guide members 16 stationarily standing on a floor. Each of the guide members 16 is formed with a vertically elongated slit 17 for inserting each projection 14 and permitting escape of the same upon sliding of the rectangular pipes 15 relative to the guide members 16. The connecting frame 10 is operatively connected to a piston 19 of a hydraulic cylinder 18 fixed on the floor. The hydraulic cylinder 18 is connected through a pipe 21 to a hydraulic jack 20.

Figure 2:
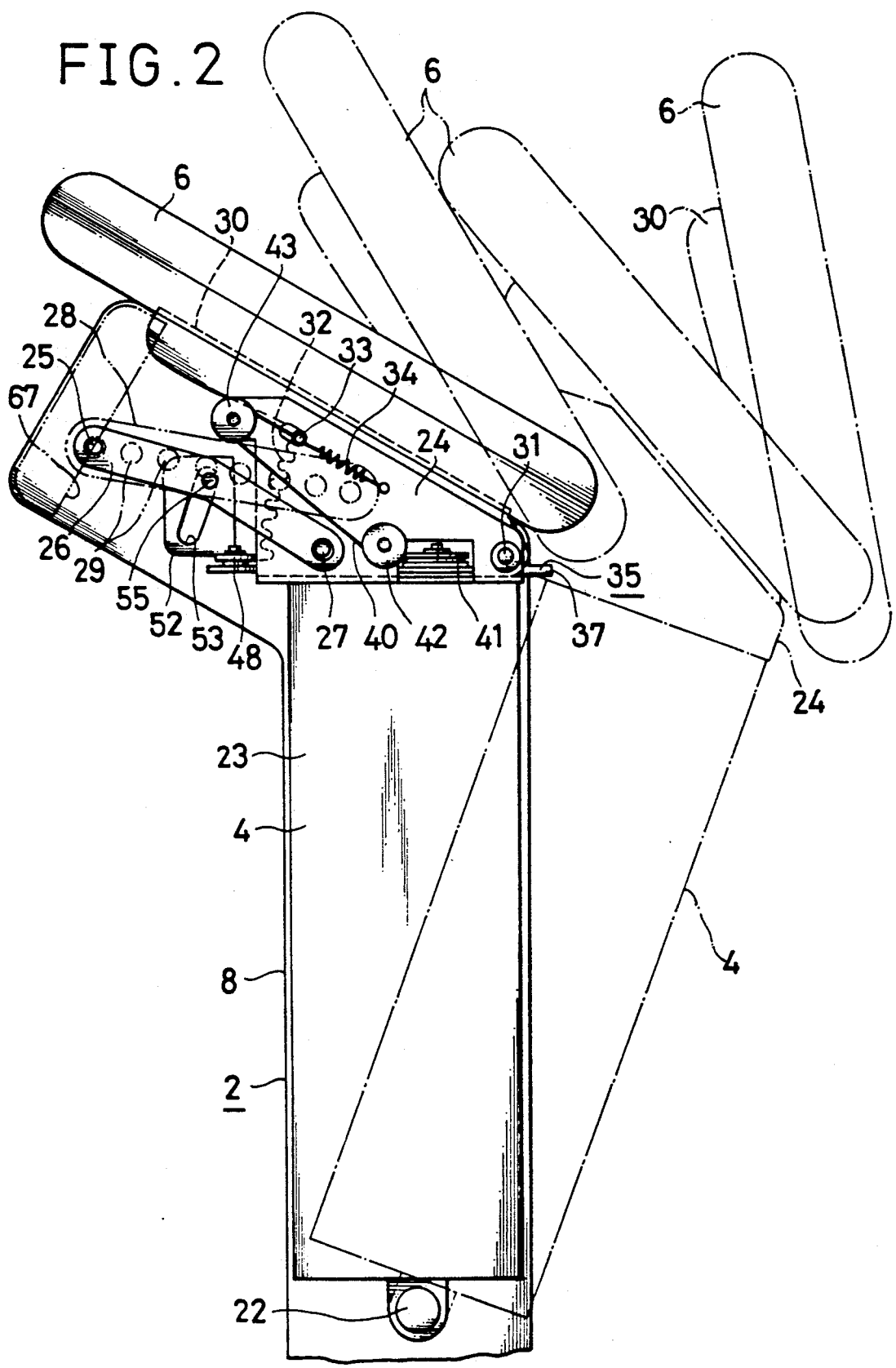
FIG. 2 is a left side view of the supporting structure for the bar code scanner and the key board.
Figure 3:
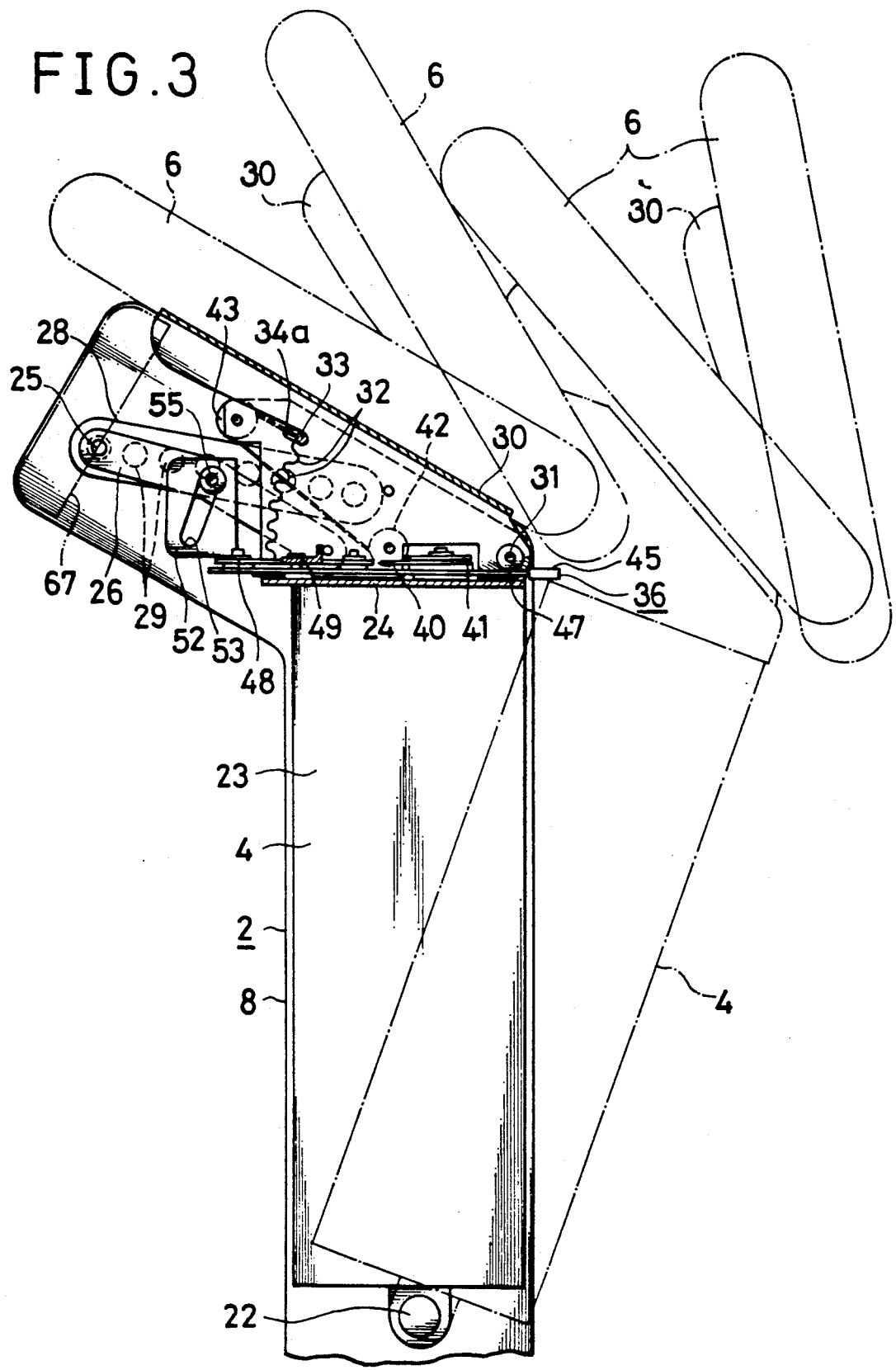
FIG. 3 is a vertical sectional view of FIG. 2.

Referring next to FIGS. 1 to 3 which show a supporting structure for the bar code scanner 4 and the keyboard 6, the bar code scanner 4 is pivotably supported at its lower end through a pivotal shaft 22 to the pillars 8 in such a manner as to be pivoted from a vertical position parallel to the pillars 8 to a rightward inclined position as viewed in FIGS. 1 to 3 (i.e., in a direction facing down to the cashier). A mounting member 24 formed of metal is fixed by screws on an upper surface of a housing 23 of the bar code scanner 4. The mounting member 24 has a substantially U-shaped configuration as viewed in rear elevation such that is opens upwardly. A pair of stop levers 26 are pivotably supported at their base ends through a pair of pivotal shafts 27 to opposite outer sides of the mounting member 24. Each of the stop levers 26 is provided at its free end with a pin 25 projecting outwardly. On the other hand, a pair of guide members 28 are fixed on the inside surfaces of the pillars 8 so as to guide the pins 25 along the rotational direction of the bar code scanner 4. Each of the guide members 28 is formed with plural engagement holes 29 arranged longitudinally thereof, one of which is engageable with the pin 25 of each stop lever 26. Each stop lever 26 is formed of an elastic material, so that it may be elastically flexed in a direction of its thickness.

Figure 5:
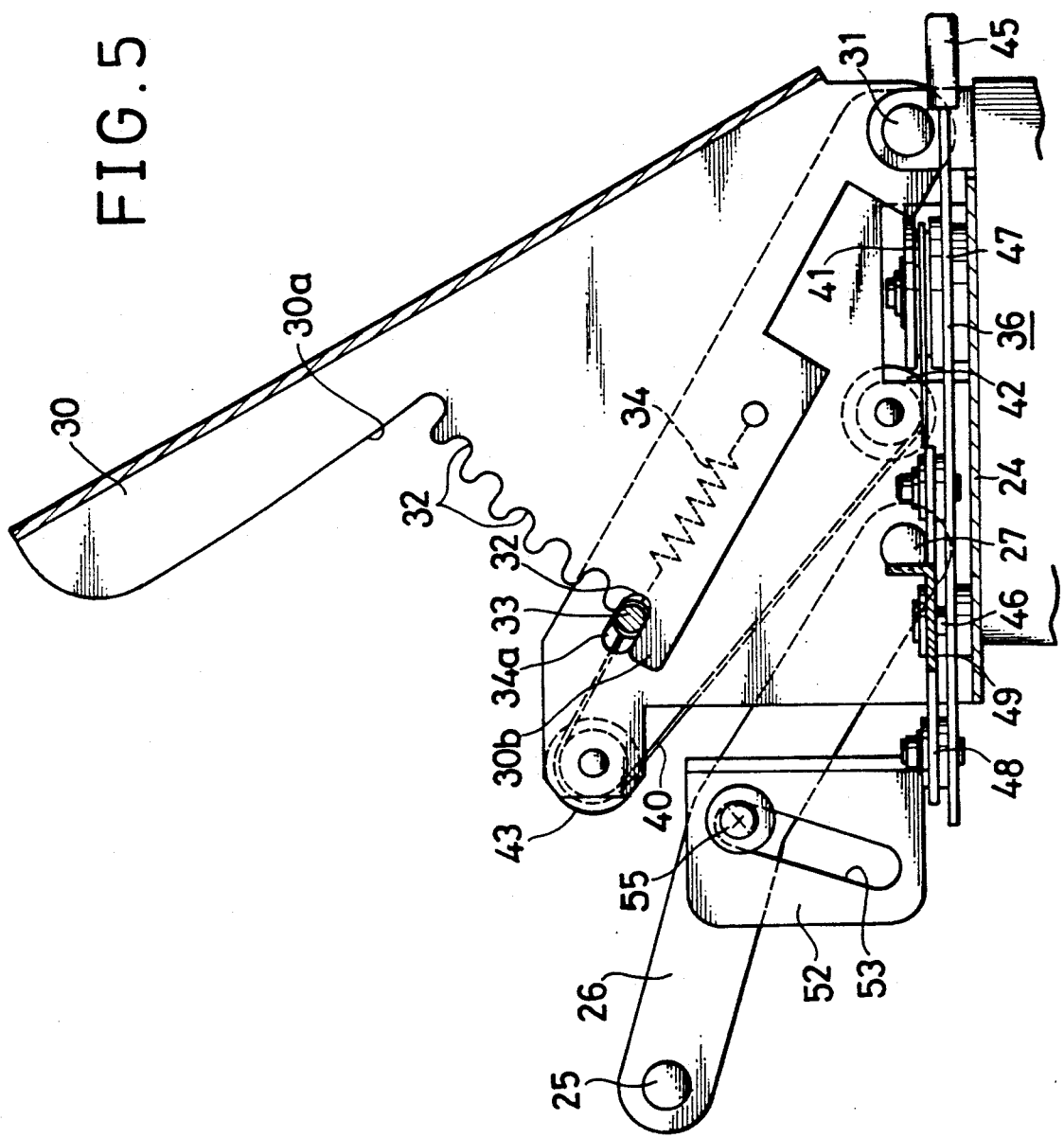
FIG. 5 is an enlarged sectional left side view of the pivotable supporting structure for the base mounting the keyboard thereon.

The keyboard 6 is provided on its lower surface with a metal base 30 having a substantially inverted U-shaped configuration as viewed in rear elevation such that it opens downwardly. The base 30 is pivotably connected on its opposite sides through a pair of pivotal shafts 31 to the opposite sides of the mounting member 24. The pivotal shafts 31 are located on the front side facing the cashier (i.e., on the right-hand side as viewed in FIGS. 1 to 3). The opposite side portions of the base 30 are formed with a pair of arcuate sawtoothed portions each having plural recesses 32 arranged on an arc about the pivotal shaft 31. Any one of the recesses 32 is engageable with a lateral shaft 33 supported in a pair of elongated holes 34a formed through the opposite side portions of the mounting member 24. As shown in FIGS. 3 and 5, each of the elongated holes 34a extends in a direction of advance and retraction of the lateral shaft 33 relative to the recess 32. A pair of springs 34 are provided to bias the lateral shaft 33 in the direction of advance and thereby resiliently engage one of the recesses 32. That is, one end of each spring 34 is connected to the lateral shaft 33, while the other end is fixed to each outer side surface of the mounting member 24.

Figure 4:
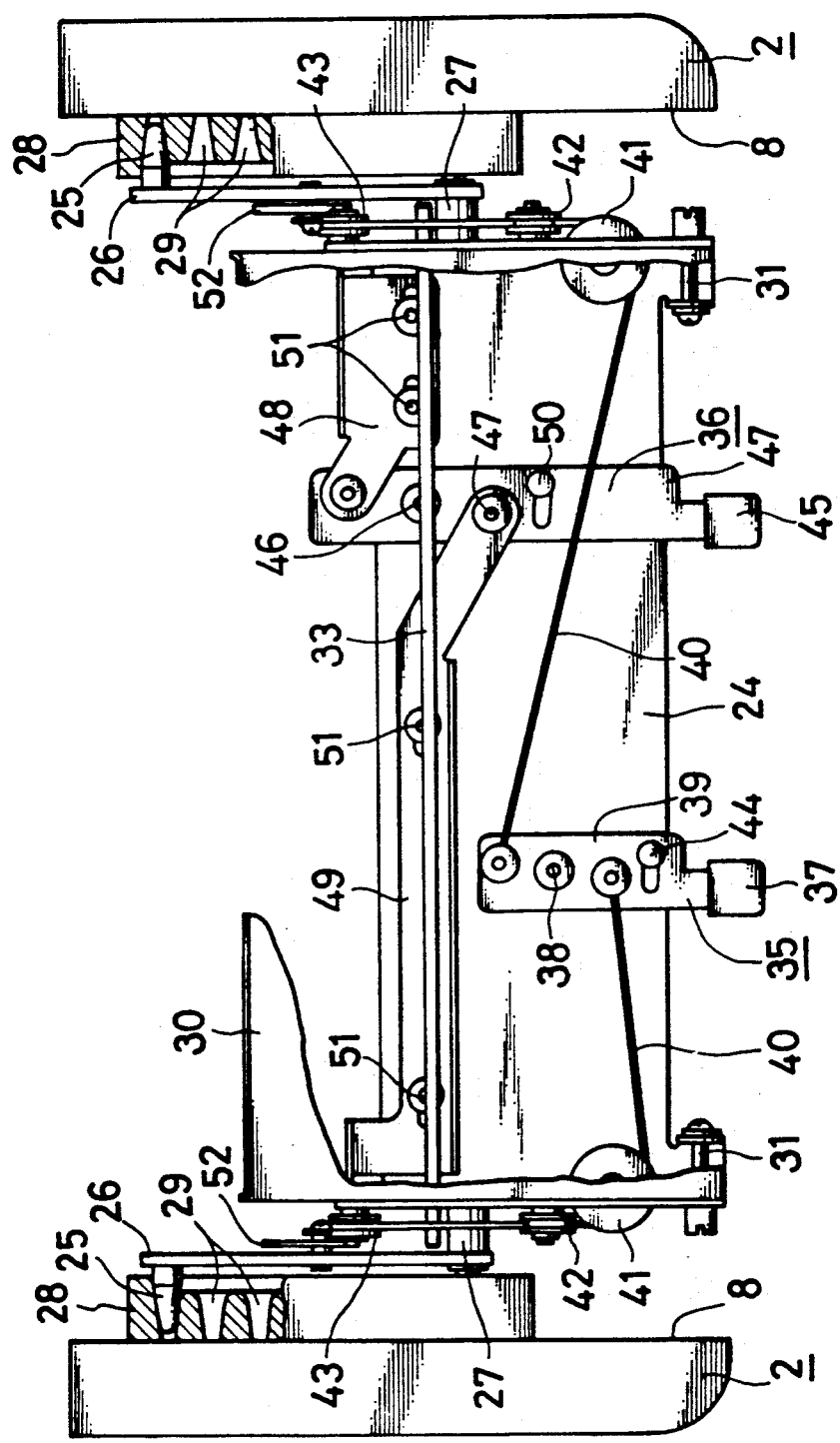
FIG. 4 is a plan view, partially broken away, of the release mechanisms mounted on the mounting member.

Referring to FIG. 4, reference numeral 35 generally designates a first release mechanism for releasing the lateral shaft 33 from the recess 32, and reference numeral 36 generally designates a second release mechanism for releasing the pin 25 of the stop lever 26 from the engagement hole 29. The first release mechanism 35 includes a knob 37 projecting toward the cashier, a lever 39 connected to the knob 37 and pivotably supported through a vertical pivot pin 38 to the bottom surface of the mounting member 24, and a pair of wires 40 connected to the lever 39 at opposite positions with respect to the pivot pin 38. The wires 40 extend from the lever 39 through plural pulleys 41 rotatably mounted to the bottom surface of the mounting member 24 and plural pulleys 42 and 43 rotatably mounted to the opposite side surfaces of the mounting member 24 to the opposite ends of the lateral shaft 33. Accordingly, the lever 39 is normally drawn clockwise as viewed in FIG. 4 by a tension of the wires 40 biased by a tensile force of the springs 34 connected to the lateral shaft 33. A stopper pin 44 is provided on the bottom surface of the mounting member 24 so as to restrict a rotational amount of the lever 39.

The second release mechanism 36 includes a knob 45 projecting toward the cashier, a lever 47 connected to the knob 45 and pivotably supported through a vertical pivot pin 46 to the bottom surface of the mounting member 24, and sliding bars 48 and 49 connected to the lever 47 at opposite positions with respect to the pivot pin 46. The sliding bars 48 and 49 are guided by plural guide pins 51 mounted on the bottom surface of the mounting member 24, and extend to the stop levers 26. The lever 47 is normally rotated clockwise as viewed in FIG. 4 by the elastic force of the stopper levers 26. A stopper pin 50 is provided on the bottom surface of the mounting member 24 so as to restrict a rotational amount of the lever 47.

Figure 6:
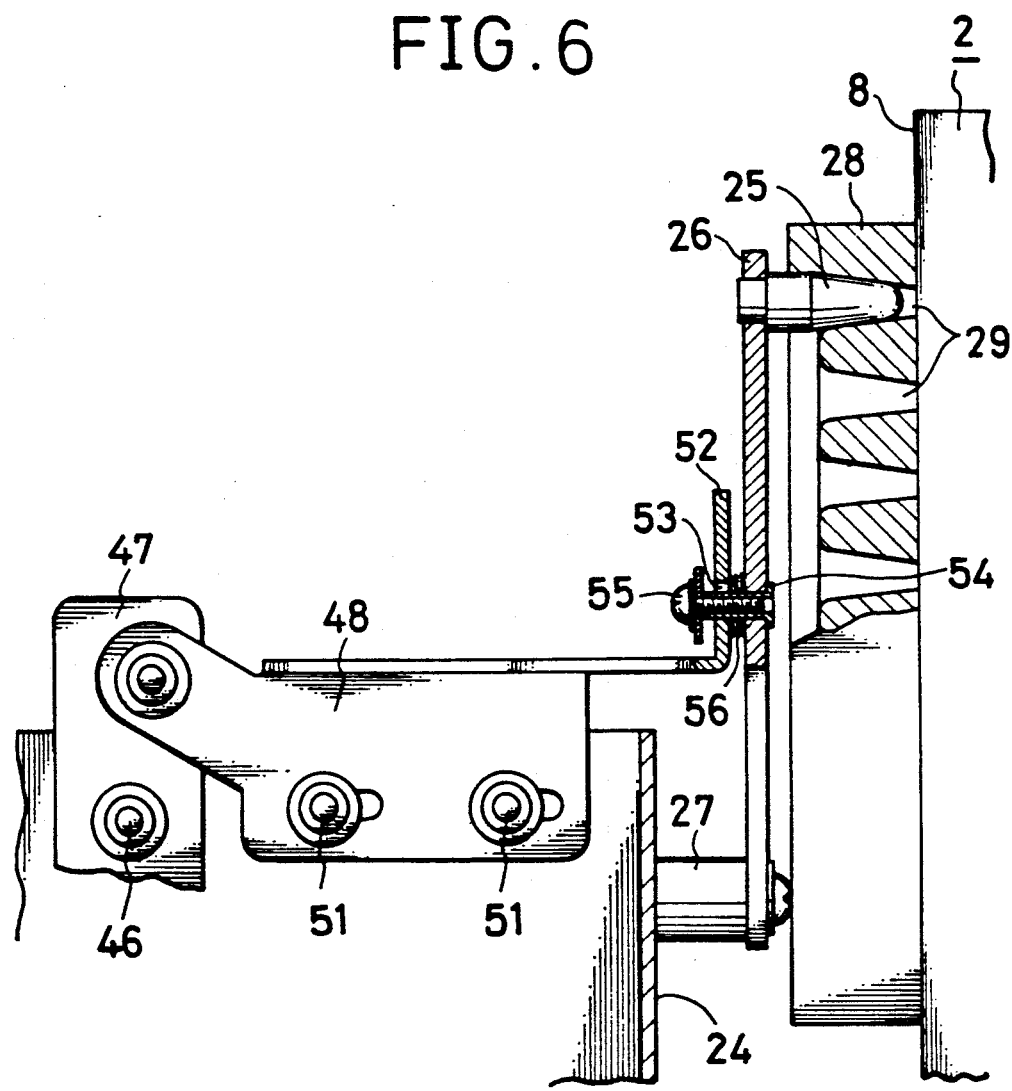
FIG. 6 is an enlarged plan view, partially broken away, of the connecting structure for the stop lever and the sliding bar.

The sliding bars 48 and 49 project outwardly from the opposite outer sides of the mounting member 24. Each of the sliding bars 48 and 49 is formed at its outer projecting end with a normally bent portion 52 extending along the stop lever 26. As shown in FIGS. 2 and 3, each bent portion 52 is formed with a substantially vertically elongated hole 53. As shown in FIG. 6, an internally threaded pipe 54 is mounted at a central portion of the stop lever 26 to project inwardly therefrom, and is inserted through the elongated hole 53 of the bent portion 52 of the sliding bar 48 (49). A screw 55 is threadedly engaged with the internally threaded pipe 54 from the inside of the bent portion 52, thereby connecting the bent portion 52 with the stop lever 26. A compression spring 56 is engaged around the internally threaded pipe 54, and is interposed between the bent portion 52 and the stop lever 26.

While the rotational amount of the lever 39 is restricted by the stopper pin 44 as mentioned above, it is defined in such a manner that even when the lever 39 is rotated counterclockwise to the limit to draw the wires 40, the lateral shaft 33 is slightly engaged with an open portion of each recess 32. In this case, the elongated holes 34a for supporting the lateral shaft 33 have a length sufficient to permit further retraction of the lateral shaft 33 from the open portion of each recess 32.

Figure 7:
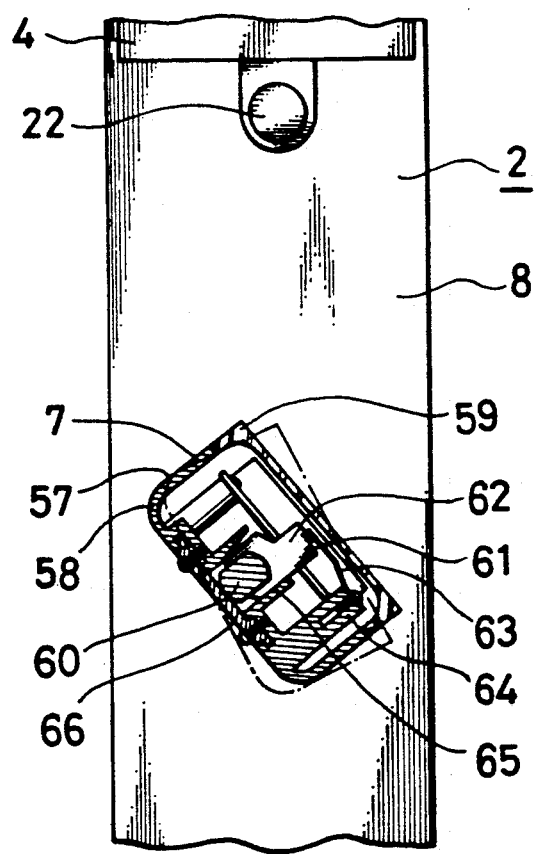
FIG. 7 is a vertical sectional left side view of the pivotable supporting structure for the display.

Referring next to FIG. 7, a housing 57 of the cashier's display 7 is formed by connecting a light transmitting cover 59 to an open top of a case 58. A special form shaft 60 is fixedly mounted between the pillars 8, and is inserted through the housing 57. A pair of plate cams 62 are fixedly engaged with the special form shaft 60 at opposite ends thereof. Each plate cam 62 is formed with an arcuate sawtoothed portion having plural recesses 61 arranged on an arc about the special form shaft 60. An engagement member 63 resiliently engaging any one of the recesses 61 is fixed by a screw to a boss 64 formed in the case 58. The case 58 is formed with a pair of slits 65 for receiving the plate cams 62. The opposite surfaces of each plate cam 62 contact the opposite inner walls of each slit 65, thereby restricting the axial movement of the housing 57 relative to the special form shaft 60. The side edge of each plate cam 62 about the axis of the special form shaft 60 is opposed to the other inner wall of each slit 65 with a predetermined plate such that a rotational amount of the housing 57 relative to the special form shaft 60 is set to about 15 degrees. The bottom of the case 58 is open so as to insert the special from shaft 60 and the plates cams 62, and the open bottom is closed by a bottom cover 66 fixed thereto by screws. While the display 7 is provided to face the cashier, another display 67 for a customer is provided between the upper ends of the opposite pillars 8 so as to face the customer.

As shown in FIG. 1, the upper portion of the frame 2 has a depth larger than that of the bar code scanner 4 in the vertical position. That is, the upper portion of the frame 2 is formed with a pair of covering portions 68 for sufficiently covering the opposite side surfaces of the bar code scanner 4 in the vertical position. Similarly, the intermediate portion of the frame 2 has a depth larger than a length of the diagonal of the display 7 as viewed in side elevation. That is, the intermediate portion of the frame 2 is formed with a pair of covering portions 69 for sufficiently covering the opposite side surface of the display 7 irrespective of its rotational position.

In operation, the lateral shaft 33 is normally biased by the springs 34 to engage any one of the recesses 32 of the base 30 of the keyboard 6. As a result, the rotational movement of the keyboard 6 is stopped to maintain the keyboard 6 stably in a desired angular position. When the know 37 of the first release mechanism 35 is operated to rotate the lever 39 in the counterclockwise direction, the wires 40 are pulled to retract the lateral shaft 33 from the recess 32 against the biasing force of the springs 34. Accordingly, the operator can rotate the keyboard 6 about the pivotal shafts 31 to adjust the angle of inclination of the keyboard 6. In this adjusting operation of the keyboard 6, the rotational amount of the lever 39 is restricted by the stopper pin 44. Therefore, the lateral shaft 33 can be maintained in slight engagement with the recess 32 as shown in FIG. 5, so that the keyboard 6 may be prevented from being unintentionally lowered by its deadweight. When the keyboard 6 is forcibly rotated under such a slightly engaged condition, the lateral shaft 33 is further retracted from the recess 32 by a component of the rotational force applied to the keyboard 6. As shown in FIG. 5, the opposite side portions of the base 30 are formed with an upper stopper 30a just above the uppermost recess 32 and a lower stopper 30b just below the lowermost recess 32, so that the lateral shaft 33 can be stopped by the upper stopper 30a or the lower stopper 30b to thereby restrict the rotational amount of the keyboard 6 relative to the mounting member 24.

On the other hand, the pin 25 of each stop lever 26 of the mounting member 24 is normally engaged with any one of the engagement holes 29 of each guide member 28. As a result, the rotational movement of the bar code scanner 4 about the pivotal shaft 22 is stopped to maintain the bar code scanner stably in a desired angular position. When the knob 45 of the second release mechanism 36 is operated to rotate the lever 47 in the counterclockwise direction, the sliding bars 48 and 49 are drawn inwardly to pull the stop levers 26 inwardly. As a result, each stop lever 26 is elastically flexed to release the pin 25 from the engagement hole 29. Therefore, the operator can rotate the bar code scanner 4 about the pivotal shaft 22 to downwardly incline the same from the vertical position parallel to the pillars 8 to a desired angular position. When the knob 47 is released from the operator's hand, each stop lever 26 is returned to its normal condition by its elasticity as outwardly pulling the sliding bars 48 and 49, and the pin 25 is brought into engagement with the engagement hole 29 as selected.

Further, the display 7 is normally maintained stably in a desired angular position where the front surface is upwardly inclined to face the cashier because the engagement member 63 is resiliently engaged with any one of the recesses 61 of each plate cam 62. When the housing 57 of the display 7 is forcibly rotated about the special form shaft 60 fixed to the plate cams 62 against the resiliency of the engagement member 63, the angle of inclination of the display 7 can be adjusted. At this time, the engagement member 63 comes into engagement with the other one of the recesses 61.

In adjusting the height of the frame 2, a pedal 20a of the hydraulic jack 20 is depressed by the operator's foot with a controlled force to supply a hydraulic pressure to the hydraulic cylinder 18. As a result, the frame 2 is lifted by the piston 19. When the operator's foot is released from the pedal 20a, the lifting operation of the frame 2 is stopped to maintain the frame 2 at a desired height. Under the condition, when the pedal 20a is fully depressed, the hydraulic pressure in the hydraulic cylinder 18 is returned to the hydraulic jack 20 to thereby lower the frame 2. Thus, the heights of the bar code scanner 4, the keyboard 6 and the displays 7 and 67 can be desirably adjusted. Furthermore, as the hydraulic jack 20 is used as a power source for lifting the frame 2, the adjustment can be carried out easily with less labor according to a height of the cashier.

In registering the commodity data, the bar code attached to a commodity is read by the bar code scanner 4 during the course that the cashier takes out the commodity from a basket placed on the sacker table 1 at one end thereof and then puts the commodity into another basket placed on the sacker table 1 at the other end. If no bar code is attached or the bar code is stained, the cashier operates the keyboard 6 to input the commodity data as alternately looking at the keyboard 6 and the surface of the commodity on which its quality or the like is indicated.

In transporting the apparatus, the bar code scanner 4 is maintained in the vertical position parallel to the pillars 8 of the frame 2. Under the condition, the bar code scanner 4 does not project from the front and rear edges of the covering portions 68 of the frame 2, and it does not therefore interfere with other furniture or the like. Further, the display 7 also does not project from the front and rear edges of the covering portions 69 of the frame 2 irrespective of its rotational position, thereby preventing the interference of the display 7 with other furniture or the like.

Figure 10:
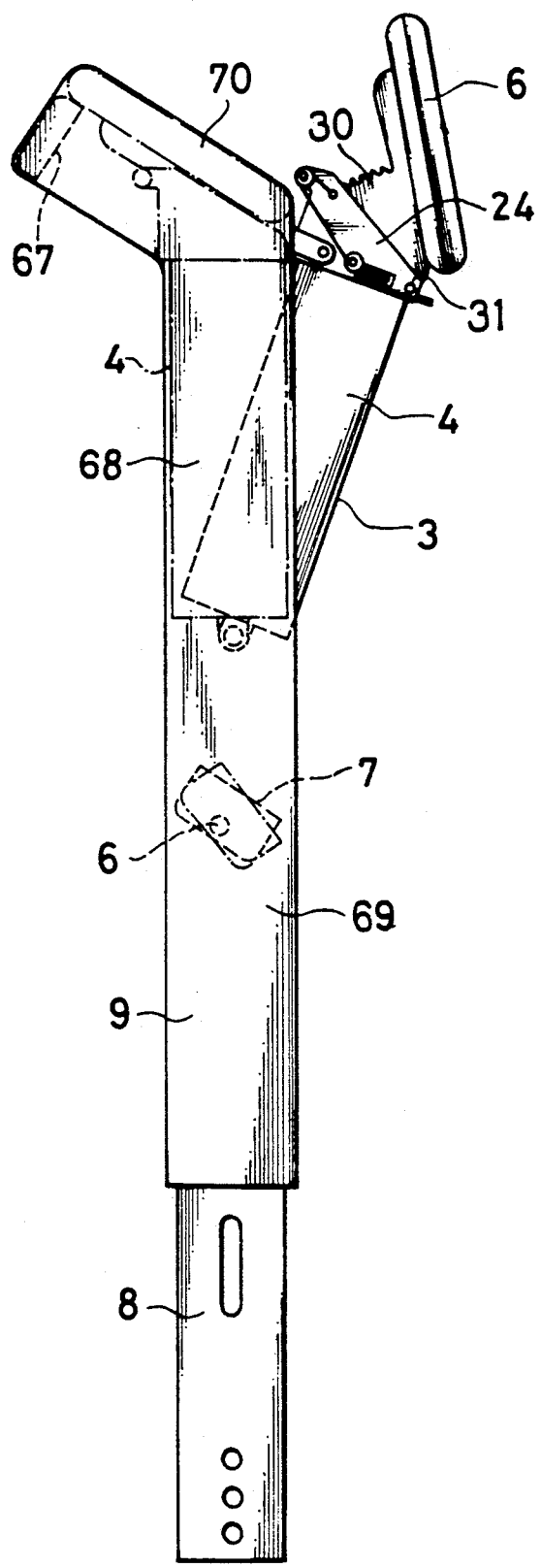
FIG. 10 is a left side view of a second preferred embodiment of the present invention.

Referring to FIG. 10 which shows a second preferred embodiment wherein the same reference numerals denote the same parts as the first preferred embodiment, a pair of covering portions 70 for covering the opposite sides of the keyboard 6 are formed at the upper end portion of the frame 2. That is, when the bar code scanner 4 is maintained in the vertical position, and the keyboard 6 is maintained at the minimum angle of elevation, the opposite sides of the keyboard 6 are fully covered with the covering portions 70. So, in transporting the apparatus, the interference of the keyboard 6 with other furniture or the like can be prevented by the covering portions 70. Similarly, the interference of the bar code scanner 4 and the display 7 with other furniture or the like can be prevented by the covering portions 68 and 69, respectively, as previously mentioned in the first preferred embodiment.

What is claimed is:

1. An apparatus for reading commodity data, comprising a bar code scanner having a reading window on a front surface thereof, a frame for pivotably supporting said bar code scanner in such a manner that said bar code scanner can be rotated from a substantially vertical position to a downward inclined position and can be maintained at a desired angular position between said substantially vertical position and said downward inclined position, a cashier's display connected to said bar code scanner and pivotably mounted to said frame in such a manner as to be rotatable about a horizontal pivotal axis and be maintainable at a desired rotational position, a pair of first covering portions formed on opposite side surfaces of said frame for covering opposite side surfaces of said bar code scanner in the substantially vertical position, and a pair of second covering portions formed on opposite side surfaces of said frame for covering opposite side surfaces of said display.

* * * * *